(12) United States Patent
Reis

(10) Patent No.: US 8,607,184 B1
(45) Date of Patent: *Dec. 10, 2013

(54) CELL UNIQUIFICATION

(75) Inventor: Andre Inacio Reis, Soborg (DK)

(73) Assignee: Nangate Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/541,569

(22) Filed: Jul. 3, 2012

Related U.S. Application Data

(63) Continuation of application No. 12/479,769, filed on Jun. 6, 2009, now Pat. No. 8,214,787.

(60) Provisional application No. 61/059,742, filed on Jun. 6, 2008, provisional application No. 61/059,744, filed on Jun. 6, 2008, provisional application No. 61/059,745, filed on Jun. 6, 2008, provisional application No. 61/059,746, filed on Jun. 6, 2008.

(51) Int. Cl.
*G06F 9/455* (2006.01)
*G06F 17/50* (2006.01)

(52) U.S. Cl.
USPC ............ 716/134; 716/101; 716/104; 716/132

(58) Field of Classification Search
USPC .......................................................... 716/134
See application file for complete search history.

(56) References Cited

U.S. PATENT DOCUMENTS

2006/0107239 A1* 5/2006 Zhang et al. ...................... 716/1
2006/0259880 A1* 11/2006 Dood et al. ........................ 716/2
2009/0083691 A1* 3/2009 Penzes ............................ 716/18

* cited by examiner

*Primary Examiner* — Jack Chiang
*Assistant Examiner* — Eric Lee
(74) *Attorney, Agent, or Firm* — Aka Chan LLP

(57) ABSTRACT

Methods reduce the number of newly created cells when creating new cells to optimize a design. Cells are created to optimize a design, but neighbor cells fitting a distribution of drive strengths and P/N ratios are used instead. This allows reducing the number of newly created cells to optimize the design, through uniquification of neighbor instances with respect to the distribution grid.

9 Claims, 13 Drawing Sheets

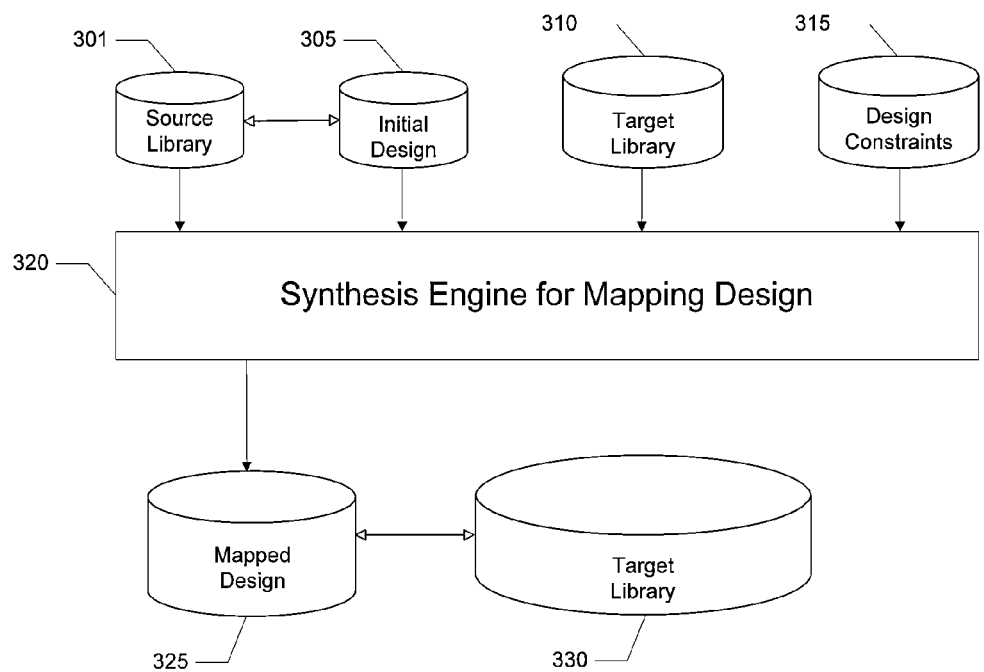
Figure 3
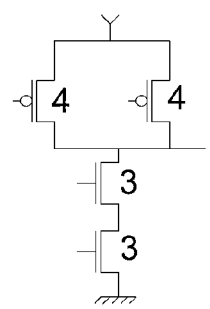 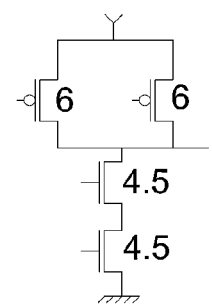
Figure 4A					Figure 4B

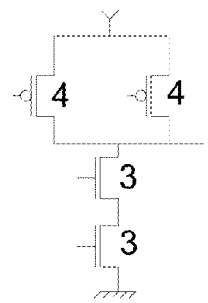
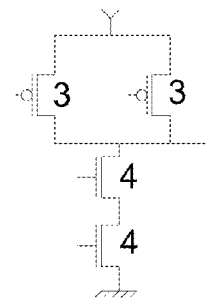
Figure 5A                    Figure 5B
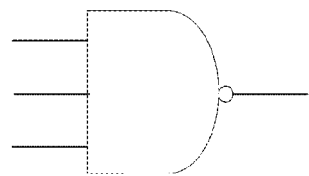
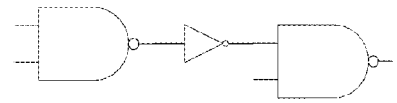
Figure 6A                    Figure 6B

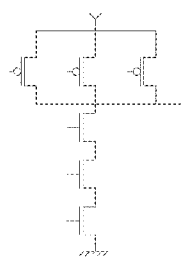 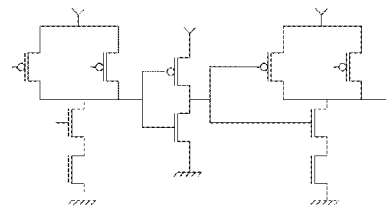 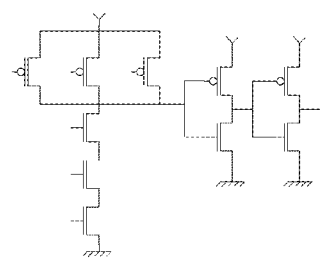
Figure 7A Figure 7B Figure 7C
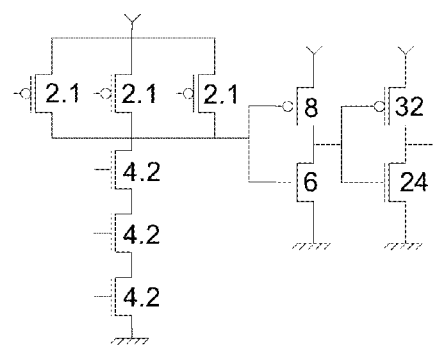 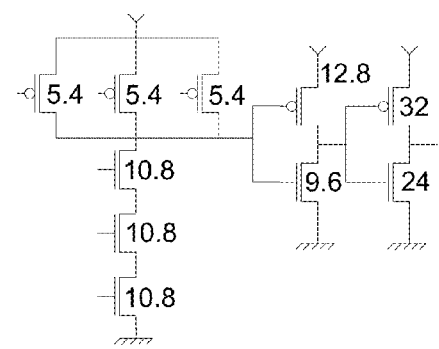
Figure 8A Figure 8B

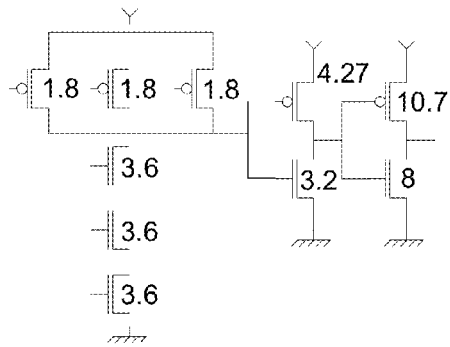
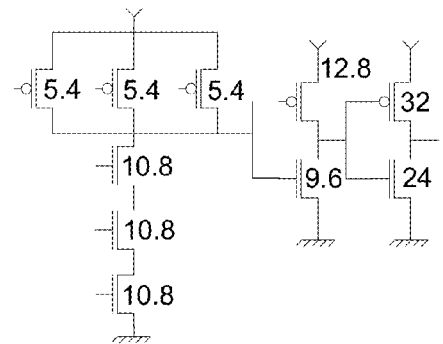
Figure 9A                                    Figure 9B
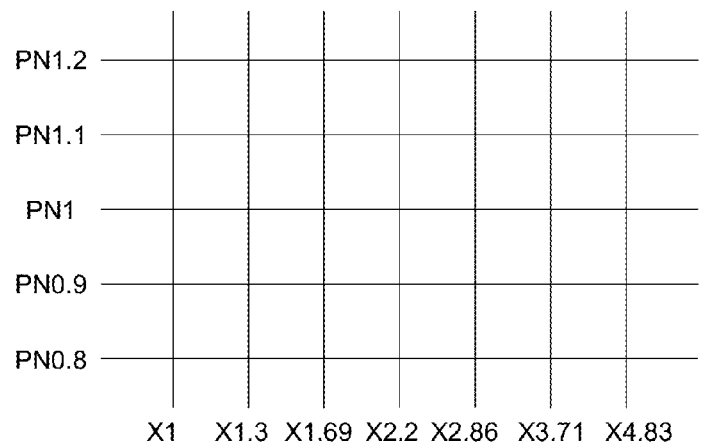
Figure 10

Seed Cell (X8)

X16 variant

X2 variant

X1 variant

X2 variant

X1 variant

Seed

X1

X1.5

X2.25

X3.38

X5.06

X7.59

X11.4

Seed

X0.1

X0.15

X0.225

X0.338

X0.506

X0.759

X1.14

Seed

X0.1

X0.15

X0.225

X0.338

X0.506

X0.759

X1.14

Reference: P/N
scale factor = 1
P/N=1.0855

P/N scale
factor = 0.9
P/N=0.9770

P/N scale
factor = 0.8
P/N=0.8684

P/N scale
factor = 1.1
P/N=1.1941

X1, P/N    sf =0.9

X1, P/N    sf =1

X1, P/N    sf =1.1

X2, P/N    sf =0.9

X2, P/N    sf =1

X2, P/N    sf =1.1

CELL UNIQUIFICATION

CROSS-REFERENCE TO RELATED APPLICATIONS

This patent application is a continuation of U.S. patent application Ser. No. 12/479,769, filed Jun. 6, 2009, issued as U.S. Pat. No. 8,214,787 on Jul. 3, 2012, which claims the benefit of U.S. provisional patent applications 61/059,742; 61/059,744; 61/059,745; and 61/059,746, all filed Jun. 6, 2008, which are incorporated by reference along with all other references cited in this application.

BACKGROUND OF THE INVENTION

This invention relates to the field of electronic design automation, and more specifically, to the optimization of digital circuits whose design is based on cell libraries.

Integrated circuits are important building blocks of the information age and are critical to the information age, affecting every industry including financial, banking, legal, military, high technology, transportation, telephony, oil, medical, drug, food, agriculture, education, and many others. Integrated circuits such as DSPs, amplifiers, DRAMs, SRAMs, EPROMs, EEPROMs, Flash memories, microprocessors, ASICs, and programmable logic are used in many applications such as computers, networking, telecommunications, and consumer electronics.

Consumers continue to demand greater performance in their electronic products. For example, higher speed computers will provide higher speed graphics for multimedia applications or development. Higher speed Internet web servers will lead to greater on-line commerce including on-line stock trading, book sales, auctions, and grocery shopping, just to name a few examples. Higher performance integrated circuits will improve the performance of the products in which they are incorporated.

Large modern day integrated circuits have millions of devices including gates and transistors and are very complex. As process technology improves, more and more devices may be fabricated on a single integrated circuit, so integrated circuits will continue to become even more complex with time. To meet the challenges of building more complex and higher performance integrated circuits, software tools are used. These tools are in an area referred to as computer aided design (CAD), computer aided engineering (CAE), or electronic design automation (EDA). There is a constant need to improve these electronic automatic tools in order to address the desire for higher integration and better performance in integrated circuits.

Therefore, there is a need for improved techniques for electronic design automation.

BRIEF SUMMARY OF THE INVENTION

This invention provides methods to enrich a cell library in such a way to provide a nearly continuous choice of cells to implement a circuit design. An emphasis of the design method is on automatic determination of the needed cell sizes and variants. The method exploits different variants on drive strengths, P/N ratios, topology variants, internal buffering, and so forth. The method allows enriching libraries to become more suitable for efficient timing closure. The method also offers means to adapt the preexisting cells to fit the final distribution, minimizing the number of new cells to be created.

The invention provides a method to enhance a cell library. The emphasis of the invention is to add extra cells to the library to form a nearly-continuous spectrum of cells, which will enable easier timing closure. The method starts with an initial library, and for groups of functions that are in the library, sets of cell variants are generated, in order to enrich the final library. The added cell variants can include a mix of drive strength variants, P/N ratio variants, and topology variants (including buffer and stage variants, as well as varying the gain among stages).

In a specific implementation, the invention is a method to enrich a cell library by adding more sizes for cells with the same functionality comprising: deriving a distribution of target sizes to cover a range of target output capacitances; relating the existing cells to the distribution; and deriving from a variety of P/N ratio variants to complete the missing points in the distributions.

In a specific implementation, a method to reduce the number of newly created cells when performing optimization of an integrated circuit design includes receiving a distribution of drive strengths, generating a specific cell to optimize the circuit, computing the drive strength of the specific cell, and using a neighbor cell specified by the distribution instead of the specific cell.

In a specific implementation, a method to reduce the number of newly created cells when performing optimization of an integrated circuit design includes receiving a distribution of P/N ratios, generating an specific cell to optimize the circuit, computing the P/N ratio of the specific cell, and using a neighbor cell specified by the distribution instead of the specific cell.

In a specific implementation, a method to reduce the number of newly created cells when performing optimization of an integrated circuit design includes receiving a distribution of drive strengths and P/N ratios, generating an specific cell to optimize the circuit, computing the drive strength and the P/N ratio of the specific cell, and using a neighbor cell specified by the distribution instead of the specific cell.

Furthermore, in various implementations, the specific cells are generated by taking into account a table of transistor sizes. Several alternative transistor networks may be considered to generate the specific cell. The distribution of drive strengths and P/N ratios may be represented as a library of cells, with data (i.e., sufficient data) to be used in a synthesis engine.

In another implementation, the specific cells are generated by taking into account a table of transistor sizes. Several alternative transistor networks are considered to generate the specific cell, and the distribution of drive strengths and P/N ratios is represented as a library of cells, with sufficient data to be used in a synthesis engine.

The data of the cells to be usable in a synthesis engine may be partially generated by simulation for some points of the distribution and for other points of the distribution it may be generated by scaling the data obtained from the simulations according to the P/N ratios and drive strengths. The data of the cells to be usable in a synthesis engine may be partially generated by simulation for some points of the distribution and for other points of the distribution it may be generated by scaling the data obtained from the simulations according to the P/N ratios and drive strengths.

Other objects, features, and advantages of the present invention will become apparent upon consideration of the following detailed description and the accompanying drawings, in which like reference designations represent like features throughout the figures.

BRIEF DESCRIPTION OF THE DRAWINGS

FIG. 3 shows a synthesis engine for mapping a design, including associated data to the process.

FIGS. 4A-4B show two different drive strengths for a 2-input NAND cell.

FIGS. 5A-5B show two different skew variants for a 2-input NAND cell.

FIGS. 6A-6B show two different topology variants for a 3-input NAND cell.

FIGS. 7A-7C show different transistor networks topologies for a NAND3 cell. FIG. 7A shows a single stage; FIG. 7B shows 3 stages, decomposed into NAND2; and FIG. 7C shows 3 stages, output buffer.

FIGS. 8A-8B show two different seed sizes for a NAND3 network. FIG. 8A shows Internal gain=4; and FIG. 8B shows internal gain=2.5.

FIGS. 9A-9B show two different drive strengths for a NAND3 network derived from the same seed size. FIG. 9A shows a drive strength X1; and FIG. 9B shows a drive strength X3.

FIG. 10 shows a bidimensional distribution grid illustrating the use of seven different drive strengths and five different P/N ratios derived from the initial seed, resulting in a distribution containing thirty-five different sizes.

FIG. 12A shows an initial wish grid; FIG. 12B shows cells specifications related to the grid; and FIG. 12C shows nearest grid points.

FIG. 13A shows an initial wish grid with desired cell specifications; and FIG. 13B shows a uniquified library with 20 cells.

FIG. 21A shows a sparse distribution, 12 cells; FIG. 21B shows a narrow distribution, 12 cells; and FIG. 21C shows a 37-cell distribution.

FIG. 23A shows an initial wish grid; and FIG. 23B shows cell specifications related to the wish grid.

FIG. 24A shows a cell specifications related to a grid; and FIG. 24B shows neighbor grid points.

FIG. 25A shows cell specifications related to a grid; and FIG. 25B shows neighbor grid points.

FIG. 27A shows neighbors of the specification; and FIG. 27B shows an 18-cell library.

FIG. 28A shows bridging neighbors; and FIG. 28B shows a 21-cell library.

DETAILED DESCRIPTION OF THE INVENTION

This application incorporates by reference U.S. patent application 61/026,222, filed Feb. 5, 2008; U.S. patent application publication 2007/0214439, published Sep. 13, 2007; and U.S. provisional patent application 60/777,561, filed Mar. 1, 2006.

Figure 1:
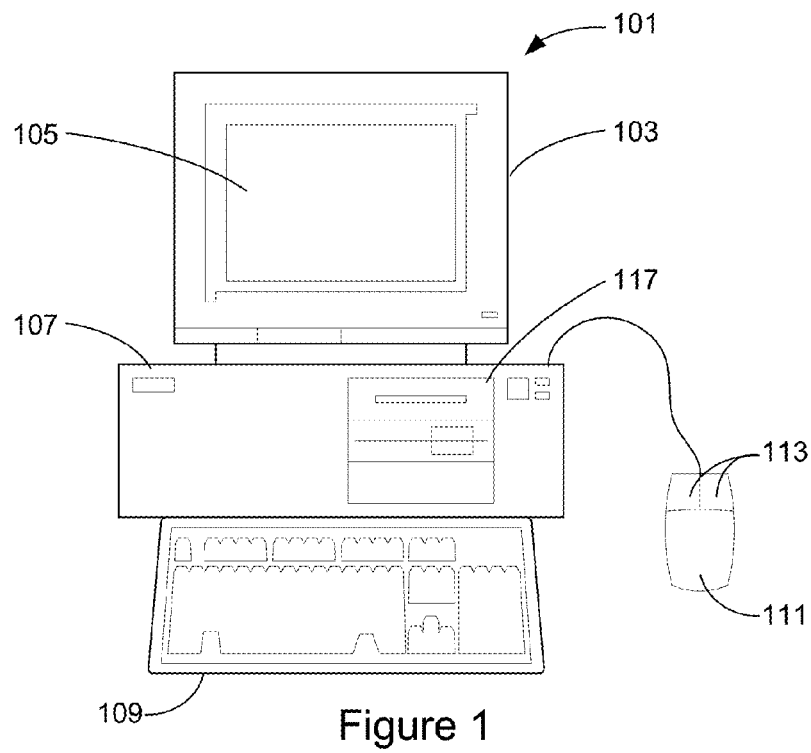
FIG. 1 shows a system of the present invention for performing electronic design automation.

FIG. 1 shows a system of the present invention. In an embodiment, the invention is software that executes on a computer workstation system, such as shown in FIG. 1. FIG. 1 shows a computer system 1 that includes a monitor 3, screen 5, cabinet 7, keyboard 9, and mouse 11. Mouse 11 may have one or more buttons such as mouse buttons 13. Cabinet 7 houses familiar computer components, some of which are not shown, such as a processor (including the possibility of a multiprocessor and gridding), memory, mass storage devices 17, and the like.

Mass storage devices 17 may include mass disk drives, floppy disks, magnetic disks, optical disks, magneto-optical disks, fixed disks, hard disks, CD-ROMs, recordable CDs, DVDs, recordable DVDs (e.g., DVD-R, DVD+R, DVD-RW, DVD+RW, HD-DVD, or Blu-ray Disc), flash and other nonvolatile solid-state storage (e.g., USB flash drive), battery-backed-up volatile memory, tape storage, reader, and other similar media, and combinations of these.

A computer-implemented or computer-executable version (e.g., a computer program product) of the invention may be embodied using, stored on, or associated with computer-readable medium. A computer-readable medium may include any medium that participates in providing instructions to one or more processors for execution. Such a medium may take many forms including, but not limited to, nonvolatile, volatile, and transmission media. Nonvolatile media includes, for example, flash memory, or optical or magnetic disks. Volatile media includes static or dynamic memory, such as cache memory or RAM. Transmission media includes coaxial cables, copper wire, fiber optic lines, and wires arranged in a bus. Transmission media can also take the form of electromagnetic, radio frequency, acoustic, or light waves, such as those generated during radio wave and infrared data communications.

For example, a binary, machine-executable version, of the software of the present invention may be stored or reside in RAM or cache memory, or on mass storage device 17. The source code of the software of the present invention may also be stored or reside on mass storage device 17 (e.g., hard disk, magnetic disk, tape, or CD-ROM). As a further example, code of the invention may be transmitted via wires, radio waves, or through a network such as the Internet.

Figure 2:
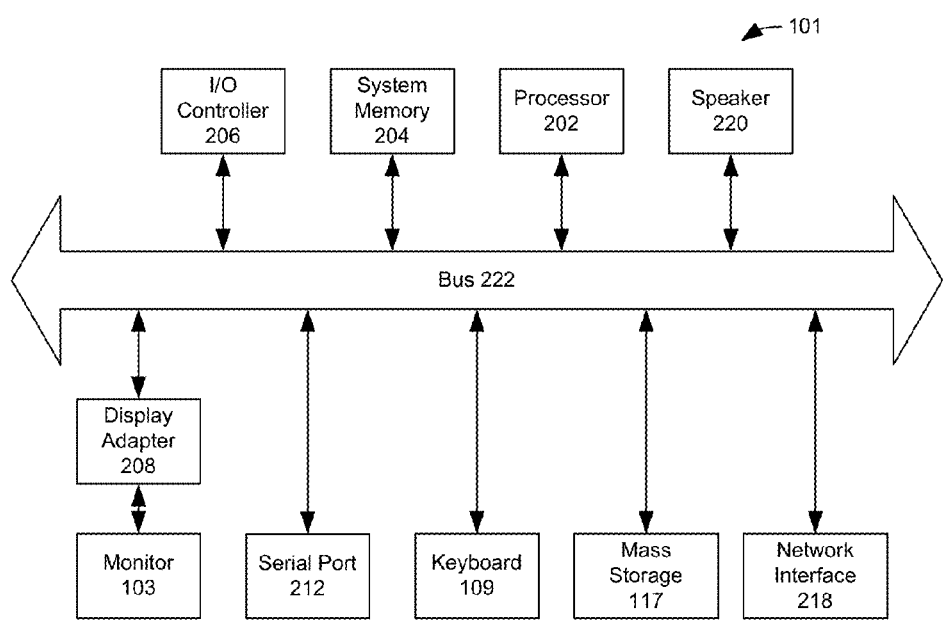
FIG. 2 shows a simplified system block diagram of a computer system used to execute software of the invention.

FIG. 2 shows a system block diagram of computer system 1 used to execute software of the present invention. As in FIG. 1, computer system 1 includes monitor 3, keyboard 9, and mass storage devices 17. Computer system 1 further includes subsystems such as central processor 202, system memory 204, input/output (I/O) controller 206, display adapter 208, serial or universal serial bus (USB) port 212, network interface 218, and speaker 220. The invention may also be used with computer systems with additional or fewer subsystems.

For example, a computer system could include more than one processor 202 (i.e., a multiprocessor system) or the system may include a cache memory.

The processor may be a dual core or multicore processor, where there are multiple processor cores on a single integrated circuit. The system may also be part of a distributed computing environment. In a distributed computing environment, individual computing systems are connected to a network and are available to lend computing resources to another system in the network as needed. The network may be an internal Ethernet network, Internet, or other network.

Arrows such as 222 represent the system bus architecture of computer system 1. However, these arrows are illustrative of any interconnection scheme serving to link the subsystems. For example, speaker 220 could be connected to the other subsystems through a port or have an internal connection to central processor 202. Computer system 1 shown in FIG. 1 is but an example of a computer system suitable for use with the present invention. Other configurations of subsystems suitable for use with the present invention will be readily apparent to one of ordinary skill in the art.

Computer software products may be written in any of various suitable programming languages, such as C, C++, C#, Pascal, Fortran, Perl, Matlab (from MathWorks, Inc.), SAS, SPSS, Java, JavaScript, TCL and AJAX. The computer software product may be an independent application with data input and data display modules. Alternatively, the computer software products may be classes that may be instantiated as distributed objects. The computer software products may also be component software such as Java Beans (from Sun Microsystems) or Enterprise Java Beans (EJB from Sun Microsystems).

An operating system for the system may be one of the Microsoft Windows® family of operating systems (e.g., Windows 95, 98, Me, Windows NT, Windows 2000, Windows XP, Windows XP x64 Edition, Windows Vista, Windows 7, Windows CE, Windows Mobile), Linux, HP-UX, UNIX, Sun OS, Solaris, Mac OS X, Alpha OS, AIX, IRIX32, or IRIX64, or combinations of these. Microsoft Windows is a trademark of Microsoft Corporation. Other operating systems may be used. A computer in a distributed computing environment may use a different operating system from other computers.

Furthermore, the computer may be connected to a network and may interface to other computers using this network. For example, each computer in the network may perform part of the task of the many series of steps of the invention in parallel. Furthermore, the network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, and 802.11n, just to name a few examples). For example, signals from a computer may be transferred, at least in part, wirelessly to components or other computers.

This invention relates to the optimization of digital circuits whose design is based on cell libraries. Most digital designs are currently based on cell libraries. This means that most design flows will have a step where the Boolean logic equations are mapped to an interconnected set of cells from the library. The cells from the library implement logic primitives (e.g., Boolean functions and storage elements) that are then connected to each other to produce the desired functionality for the complete circuit.

The step of converting the equations to a set of interconnected cells is done in a way to obey constraints in some costs (typically required frequency) while minimizing other costs (typically area and power). This step is referred to as technology mapping, and there are several tools available from different vendors or universities to perform technology mapping. The inputs to this tool typically are a design, a predesigned library, and the optimization goals. The quality of a cell-based design depends heavily on the quality of the library that it is used for the design. The goal of the invention presented here is to produce better libraries, having as a consequence better designs and a more efficient way to perform timing closure.

Cell-based design can involve the concepts of mapped and unmapped designs, source library, optimization goals, design constraints, target library, available logic functions, synthesis engine, cell drive strength, drive strength distribution, cell p-to-n (P/N) ratio and skew variants, cell topology variants, cell buffer variants, cell folding variants, multistage cells and stage gain on multistage cells. These concepts are briefly discussed below.

Mapped and Unmapped Design. A design is said to be mapped when it is expressed as a network of interconnected cells from a library. Each cell in the library may be instantiated many times; some may be instantiated few times (perhaps even just once) and some cells available in the library may not be used at all. A design is said to be unmapped when it is described at a higher level, without making references (instantiations) of cells from a library as subdesigns.

Technology Mapping. Technology mapping is the task of minimizing design costs while converting an unmapped design into a mapped design.

Remapping. Remapping refers to the conversion of a mapped design into a different mapped design.

Technology-Independent Optimization. Technology-independent optimization refers to the conversion of an unmapped design into a different unmapped design.

Unmapping. Unmapping refers to the conversion of a mapped design into an unmapped design.

Source Library. When the initial design is a mapped design, it is associated with a library (by definition a mapped design is associated to one or more libraries). The source library is the library to which the initial design is associated.

Optimization Goals and Design Constraints. Optimization goals and design constraints describe to an optimization tool the requirements of the designer for the particular design being treated. Typically the optimization tool receives a mix of optimization goals and design constraints, which can be expressed for various points of the circuit.

Examples of this include: (1) The minimization of area and power while respecting desired arrival times and frequencies, (2) the reduction of timing (delay) and while respecting maximum area, and (3) to respect maximum area while increasing yield. Many other combinations of design goals and constraints can be used by designers to achieve their goals without limiting the scope of the method.

Target Library. For any optimization step that produces a mapped design, which will refer to a library, it is necessary to specify the target library, containing the cells that can be used by a mapping tool. It is possible for mapping tools to deal with more than one target library, as the available cells can be divided into different libraries.

Available Logic Functions. Each library has a number of available logic functions that can be implemented as a single cell from the library. Functions that are not directly available in the library as a single cell can be implemented as an interconnection of several cell instances. Indeed, one of skill in the art will recognize that any combinational logic function can be implemented by using multiple instances of a NAND2 cell. Depending on the designer of the library, the choice of available logic functions can include more or less logic functions. This can vary from just a few functions to more than a thousand different functions available as cells, for different experiments reported in the literature.

Synthesis Engine for Mapping Design. A synthesis engine for mapping design is a software tool to produce a mapped design. At that time, some constraints are respected (e.g., required frequency or maximum area) and some design costs (e.g., area or power consumptions) are reduced. The synthesis engine takes an initial design, a source library, a target library, and a set of design constraints and optimization goals. The synthesis engine can be used in incremental modes for faster turnaround.

The output of the synthesis engine is a mapped design that refers to (e.g., instantiates) cells from the target library. The initial design can be an unmapped design. In an implementation of the invention, the source library is not necessary. In another implementation, the source library and the target library are the same library.

FIG. 3 shows a synthesis engine for mapping a design. The synthesis engine includes a source library 301, an initial design 305, a target library 310, and a set of design constraints or optimization goals 315. The process includes the movement of the associated data through the synthesis engine for mapping design 320, which produces a mapped design 325 and further a target library 330. These concepts, together with the presented references, clearly show the scope and background of the invention.

An advantage of the method is that is provides an automatic way to generate a library that covers a continuous spectrum for a wide variety of cell variants. This way, users can obtain a cell library that has the full potential to provide the support for high performance integrated circuit design.

Cell drive strength. The drive strength of a cell is a relative measure of the output load (capacitance) it can drive. The drive strength variants are versions of given cells with same transistor networks and same (or roughly the same) relative proportion among transistors, but with different transistor sizes so that the cells are aimed to have different abilities to deliver current at the output. This way, different drive strengths are viewed as options to drive different output loads or capacitances. In a specific implementation, drive strength of a specific cell is computed using a neighbor cell specified by a distribution (e.g., distribution of drive strengths or P/N ratios) instead of the specific cell (i.e., not using the specific cell).

FIGS. 4A-4B show two examples of different drive strengths for a 2-input NAND cell.

Drive Strength Distribution. The distribution of drive strength is an important factor for the quality of a library. It is important for timing closure to have a continuous or nearly continuous spectrum of library cells. Further, an important characteristic is the maximum gap in the drive strength distribution.

Cell P/N Ratio and Skew Variants. Skew variants are versions of given cells with same transistor networks and same (or roughly the same) relative proportion among transistors of the same type, but different ratios between PMOS and NMOS transistors. Normally skew variants offer cells with different P/N ratios but same (or roughly the same) input capacitance. This way, different skew variants are used to balance effects of asymmetric transitions, especially on critical paths.

FIGS. 5A-5B show examples of two different skew variants for a 2-input NAND cell.

Cell topology variants. The topology variants are versions of a same cell such that the interconnection of transistors is different (nonisomorphic). This can include internally dividing a cell stage into more than one stage or vice versa, and changing the order of serially connected transistor networks, or any other method to derive a nonisomorphic transistor network that performs the same logic function.

FIGS. 6A-6B show two different topologies for a 3-input NAND cell. A single stage topology is meant to be a single stage composed of six transistors while the three stage topology has ten transistors (four transistors for each of the 2-input NAND cells and two transistors for the inverter).

Cell Buffer Variants. Cell buffer variants are topology variants of a cell obtained by internally buffering the output.

Cell Folding Variants. Cell folding variants are topology variants of a cell that divide large transistors into an equivalent number of smaller transistors connected in parallel. A reason to perform folding is to adapt the transistor topology of the cell to the desired cell template. A given cell template normally has a maximum transistor size it can accommodate. This way, transistors larger than the maximum supported by the target library template are divided into smaller transistors connected in parallel.

Multistage cells. Multistage cells are cells which are composed of more than one static CMOS complex gate. Multistage cells can happen for any number of reasons. For example, a first reason, the use of internal buffering implies multistage cells. This is the case of a 2-input NAND cell with a 2-stage internal buffer at the output.

A second reason, multistage cells are used to limit the number of series transistors. This is the case of a 6-input NAND cell, which cannot be implemented as a single stage cell as the use of six series transistors is not efficient due to electrical reasons.

A third reason, multistage cells can happen due to the nature of the logic function implemented in the cell. This is the case of any cell having binate or positive unate inputs. For instance a 2-input AND cell is normally implemented with two stages: a 2-input NAND cell followed by an inverter.

Stage Gain on Multistage cells. In the case of multistage cells, intermediate stages will be driving other intermediate stages or the output stage. The drive strengths of different stages will in most cases be distinct for each of the stages. The ratio of drive strengths between successive stages determines the gain of internal (nonoutput) stages. This is an important parameter for multistage cells.

Library Template. As the final layout of the complete design is done by placing cells side by side, the design of the cells is restricted so that they will fit together more easily when placed this way.

Vendors can provide libraries with different templates to accommodate different design goals, like low power consumption or high speed. It is not uncommon for a vendor to provide at least three different standard cell libraries for the same technology node: general purpose, high-speed, and low-power versions of the libraries. These libraries will use different templates and have different row heights and power grid sizes. Thus, designers can choose among the three different versions of the library to accommodate their designs.

Library templates are discussed in other techniques with the name of cell architecture. Library templates are also discussed in U.S. Pat. No. 6,539,533 with the name of cell constraints file or cell overall plan, which is incorporated by reference.

Drive Strength, Size, and Area. The drive strength of a cell is related to the ability of a cell to provide current to charge or discharge an output node. For multistage cells, the drive strength depends mainly on the last stage of the cell. The "size" of the cell can be measured with different meanings, such as input capacitance of the cell, sum of transistor sizes (widths), or final area after layout. The word "size" then depends on context.

For cells having the same topology, the area of a particular drive strength cell tends to be proportional to the drive strength. However, this is just a tendency. This is not the case for drive strengths with different topologies. For example, consider a multistage cell topology with an output buffer, which is smaller than the unbuffered version for high drive strengths, and larger than the unbuffered version for smaller drive strengths.

After obtaining a sized transistor network for a particular cell, it may need folding when performing the final layout of the cell. It may also be necessary to adapt it to a particular library template, which can also make the relation between drive strength and area less linear than expected previously.

When creating specific cells for optimizing a design, many similar sizes can be obtained if no prior restriction is made to the cells to be used. The method presented here provides a means to group specific cells required to optimize a design into instances of the same cell, when the behavior of the required cells is similar.

A method of the invention performs uniquification by comparing the cells to be added in the library with cells already present in the library. Other methods perform uniquification by comparing the cells to be added in the library with cells already present in the library. These other methods have some problems. First, it depends on the order that new cells are introduced in the library. Second, it is difficult to guarantee properties of the final distribution of cells resulting from the uniquification. The method presented in this application overcomes these problems.

Other methods are devoted to add virtual cells as intermediate sizes to cells already available in the library. The data for the virtual cells used as intermediate sizes are derived from the cells present in the library used as an input. However, these prior methods do not provide the means for uniquification of cells.

A library can be used to expand and contract the design space in order to overcome local minima. A method to generate from scratch a library that represents a continuum space for the choice of cells is presented. This method is used to enrich a library with new cells to guarantee a nearly continuous space for choosing the cells. A goal of the current method is to reduce the number of specific cells created to be used in a specific context to optimize a design.

Other methods have performed two experiments to verify how the quality of a library affects the quality of the final design. These experiments have been previously reported. These experiments are also recalled again in more recent methods, but have not been reproduced in recent technology. None of these methods are devoted to enriching libraries, nor do they provide a means for uniquification of cells.

Other methods have experimented with cell libraries, including the use of what is called a semi custom approach which relies on continuously sized libraries. This approach considers a fixed P/N ratio per cell, which is optimized before synthesis. According to these methods, "the topological design space of the gates is restricted to varying the p- to n-FET width ratio and the optimal ratio is determined analytically."

Furthermore, the single P/N ratio is justified as " . . . the optimal P/N ratio of any CMOS gate depends only on the gate type and the corresponding timing arc but is entirely independent of the structure of the circuit path." This is different from the goal of the method presented here, which is to enrich a library with new cells to guarantee a nearly continuous space for choosing the cells. This other method also does not provide the means for uniquification of cells.

Another method heavily depends on creating new drive strengths by connecting cells in parallel. However, this approach presents problems with respect to delay testing due to the parallel connection of cells to obtain new drive strengths. This approach is different from the method presented here as the goal of the method presented in this application is to enrich a library with new cells to guarantee a nearly continuous space for choosing the cells. The earlier method does not provide the means for uniquification of cells.

Other methods investigate the effect of varying the degree of continuity of a cell library. This method derives a library with ratio 1.05 in between cells and a library with ratio 1.3 in between cells. Other examples of the ratio in between cells include 1.01, 1.02, 1.03, 1.04, 1.06, 1.07, 1.08, 1.09, 1.1, 1.2, 1.4, 1.5, 1.6, 1.7, 1.8, and 1.9. However, this approach does not have any of the following notions: (1) automatic generation of the cell sizes, (2) including different P/N ratios as cell variants, (3) including transistor topologies as cell variants, (4) scaling cell sizes to cover a target output capacitance range, or (5) sizing of the seed cells. This is different from the method of the present application, which is to enrich a library with new cells to guarantee a nearly continuous space for choosing cells. Other methods do not provide a means for uniquification of cells.

Another approach is devoted for sizing cells in a library without including the notion of several different drive strengths. This approach does not deal with continuous libraries and is different from the approach presented in this application. One of the goals of the invention is to enrich a library with new cells to ensure a nearly continuous space for choosing the cells. This previously proposed method also does not provide a means for uniquification of cells.

Another method sizes cells such that they will have a predetermined delay at a nominal function load (which is used for all the cells with the same functionality). This is different from the approach in this application because a goal of the invention is to enrich a library with new cells to ensure a nearly continuous space for choosing the cells. The other method also does not provide a means for uniquification of cells.

In summary, other methods do not provide a means for the uniquification of cells. The technique of the invention provides a greater ability to treat multistage transistor networks in a single cell, using the gain in between stages as a parameter. The notion of performing Pareto analysis to eliminate dominated sizes is also an advantage of the invention.

The technique of this invention is done in two parts: first, the cell distributions are described. Second, the method describes how to use a wished distribution to uniquify the cells being added to the library.

In the first aspect, cell distributions of a nearly continuous spectrum of cells are described. Given a desired functionality to be inserted in a cell library, it is possible to derive a transistor network that implements the desired functionality. This is the basis of switch theory and different transistor networks, which can be generated to implement a given functionality. In a specific implementation, several alternative transistor networks (e.g., two or more, three or more, and so forth) are considered (e.g., used) to generate a specific cell.

FIGS. 7A-7C show three different transistor networks that implement a 3-input NAND cell. FIG. 7A is a single stage network, FIG. 7B is a three stage network where all the stages have been limited to (at most) two transistors in series, and FIG. 7C is a three stage network with a two stage output buffer. All the networks in FIGS. 7A-7C can be viewed as topology variants for implementing a 3-input NAND cell.

One of skill in the art will appreciate that in specific situations, any of the three topology variants can present advantages. For example, the FIG. 7C variant tends to have a smaller area for high drive strengths (at an expense of a larger intrinsic delay), while FIG. 7A will have a smaller area for small drive strengths (and always a smaller intrinsic delay compared to FIG. 7C for the same drive strength). FIG. 7B has the advantage of providing one high speed input (at the last stage of the cell), and is useful for unbalanced arrival times.

Any of the three transistor networks in FIGS. 7A-7C can be sized to have a better proportion among the transistors that compose the network.

As an example of this method, FIGS. 8A-8B show two differently sized networks derived from the network in FIG. 7C. The network in FIG. 8A is an area-oriented size version of the cell, in which the gain for the internal stages is 4. FIG. 8B is a speed-oriented size version, where the gain for the internal stages is 2.5. The internal stages can have any amount of gain (e.g., 1, 1.5, 2, 3, 3.5, 4.5, 5, and so forth). Any of the alternative sizes presented in FIGS. 8A-8B can be used as seed sizes to generate a continuous distribution of drive strengths.

Once a sized version of the network implementing a cell is available, a nearly continuous distribution of drive strengths can be generated. Different drive strengths of a same cell roughly preserve the proportion among the size (width) of transistors in the cell.

When comparing the two alternative drive strengths shown in FIGS. 9A-9B the ratio between the drive strengths is three, meaning that the network in FIG. 9B is able to cope with a load three times larger under the same timing conditions as the network in FIG. 9A. For example, if the network in FIG. 9A is designed to drive a capacitance C, then the network in FIG. 9B is designed to drive a capacitance 3C. For the sake of simplicity, the network in FIG. 9A will be referred to as having an X1 drive strength and the network in FIG. 9B as having an X3 drive strength. If these networks were the only networks available, and a circuit had to be designed to drive a capacitance equal to 1.7C, the X3 cell would be 76 percent oversized and the X1 would be 41 percent undersized.

Ideally, the designer could have a 0 percent error if a continuously sized library is available. However, the use of a continuously sized library is typically not possible, as it is too expensive to design and maintain. Nearly continuous libraries can be used to bring the cost of library development to a manageable and acceptable level. One of the advantages of this invention is to allow the user to rapidly exploit the degree of continuity of a library. This concept is illustrated through table A below, which shows the rounding error when picking a cell from the library to implement a target X1.7 cell (not available in the library). Notice that the average of the relative errors for rounding up or down the cell reduce as sizes are added.

TABLE A

| # of sizes | Sizes available | Undersize error | Oversize error |
|---|---|---|---|
| 2 | X1 and X3 | −41% (X1) | +76% (X3) |
| 3 | X1, X1.73 and X3 | −41% (X1) | +2% (X1.73) |
| 4 | X1, X1.44, X2.08 and X3 | −15% (X1.44) | +22% (X2.08) |
| 5 | X1, X1.32, X1.73, X2.28 and X3 | −22% (X1.32) | +2% (X1.73) |
| 6 | X1, X1.25, X1.55, X1.93, X2.41 and X3 | −8.8% (X1.55) | +14% (X1.93) |

TABLE A-continued

The method presented here addresses the following aspects in generating a distribution of cells to insert in a library: (a) What is the range of capacitances the alternative versions of the cell have to drive? (b) Which is the maximum error admitted when rounding a cell? (c) How to distribute cell sizes in between? (d) How many cells are allowed by the designer?

The method provides means to generate a distribution of cells from a seed size network, a target range of capacitances to be driven, a maximum rounding error and a distribution function. At the same time, the method helps to control a trade off between the maximum rounding error that can arise for the distribution and the number of cells in the library. These aspects of the method are discussed in the following.

The range of output capacitances to be driven by the cells is related to the cell sizes that will be available in the library. The smallest cell in the library is designed to drive the smallest capacitance in the target range; while the largest cell in the library is designed to drive the largest capacitance in the target range. This observation implies the need to be able to scale the seed size of the network in such a way it is adapted to drive a specific target output capacitance. Several means can be adopted to make this scaling of the seed size to the output capacitance of the cell.

One method is to scale the seed size of the cell to drive the target capacitance with a gain that is in an acceptable range. The gain of the cell relates pin input capacitance with the target output capacitance to be driven. The acceptable range of gains for a cell can be computed by using the logical effort theory. One of skill would appreciate that the effective fan out of a cell can be adjusted between fan out 1 and fan out 10 using Equation (1), where LE is the logical effort of the cell, Cout is the target output capacitance and Cin is the input capacitance of an input pin of the cell.

Equation (1) is represented by the formula: $1 < LE*(Cout/Cin) < 10$

Consider that the seed cell is always scaled to a fixed gain FG, to generate the sizes in the library, as shown in equation (2). In this case, equation (3) shows that the size of the transistors in the network (represented by Cin) is directly proportional to Cout, as FG and LE are constant for the seed and scaled cells. Notice that the gain the cells will have when instantiated from the library will not be equal to the specific value of FG, the value of FG is used to adapt the distribution of sizes in the library to the range of capacitances that is expected in a given application. The use of a smaller FG will result in larger cells and shift the distribution to the highest output capacitance in the target range; conversely, using a larger FG will result in smaller cells and shift the distribution to the smallest output capacitance in the target range. Using a value of FG around 4 is a desirable (e.g., good) value as it results in a distribution of cells covering the target range with and effective fan out of 4 (which is referred as FO4 for one of skill in the art).

Equation (2) is represented by the formula: $LE*(Cout/Cin) = FG$

Equation (3) is represented by the formula: $Cin = (LE/FG)*Cout$

A distribution of drive strengths between an interval of target capacitances delimited by a minimum capacitance and a maximum target capacitance. A maximum capacitance is done in such a way to be able to drive any target output capacitance in the range with a cell from the library with a maximum (allowed) rounding error specified by the designer. In fact, the maximum error can be a parameter to generate the distribution, in order to guarantee a nearly continuous library.

FIG. 10 shows a bidimensional distribution grid illustrating the use of seven different drive strengths and five different P/N ratios derived from the initial seed, resulting in a distribution containing thirty-five different sizes. From the initial distribution derived from a given seed, P/N ratio variants can be generated for every cell. The P/N ratios are variations of a cell that have similar input capacitance, but different ratios of PMOS and NMOS sizes. This will generate a bidimensional grid containing different drive strengths and P/N ratios derived from the initial seed. Seeds with different P/N ratios can be generated and then scaled to cover the drive strength (target output capacitance) interval with a similar effect.

Figure 11A:
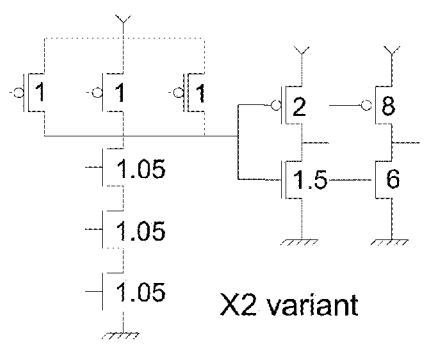
FIGS. 11A-11B show an example of Pareto simplification.
Figure 11B:
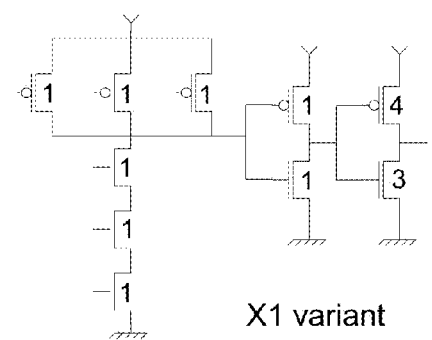

FIGS. 11A-11B show one example of Pareto simplification. The size and P/N ratio distributions can be generated for more than one network topology targeting the same logic function. In this implementation of the method, Pareto simplifications can be performed for cells designed to drive the same target output capacitance. A cell with worst-case area and delay can be excluded from the library if another cell designed for the same target capacitance provides a smaller area and delay.

Pareto simplifications may be performed for cells with the same topology, as shown in FIG. 11. The X1 variant has several transistors rounded up to the minimum technology size; this way, the X2 variant is able to deliver more current to the output, while having approximately the same input capacitance and a similar delay. In this scenario, the X1 variant could be eliminated from the distribution because the X2 variant is typically better if these parameters are the only parameters taken into account.

The method can be executed to produce distributions of drive strengths and P/N variants for each seed size independently. This allows for parallel implementations of the method, as parallel computers are becoming more available. It is also possible to select different ratios for drive strengths of different functions. Thus, more used cells like inverters and buffers can have a smaller error and a wider coverage compared to less frequent cells. Additionally, different seed networks can be targeted to different target output capacitance ranges as a function of the seed topology, notably the number of stages.

Pareto analysis can be performed on different seed networks associated to the same logic functionality. This includes selection of just the smaller area (before or after layout) variant, smaller ΣW variant, smaller input capacitance, smaller intrinsic delay or smaller power consumption variant for each drive strength; more broadly, Pareto analysis could select any combination of the winning cells listed before.

The method can also be applied to memory elements, flip-flops (FFs), and latches. However, in these specific cases some transistors of the seed network cannot be scaled or have specific scaling rules. For example, it is possible to scale only the inverters connected to the output or add an output buffer for the specific purpose of scaling the drive strengths of memory elements, flip-flops (FFs), and latches. Further, using an output buffer may not be needed for small drive strengths. Pareto simplification could eliminate these cases when more than one seed network is used for the same topology.

The description of the method is done in two parts: first, the cell distributions are described. Then the second aspect is described, which is how to use a wished distribution to uniquify the cells being added to the library.

Figure 12A:
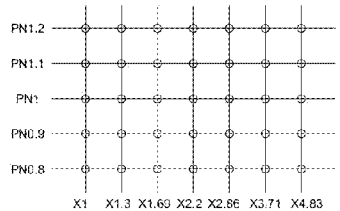
FIGS. 12A-12C show cell uniquification based on a wish grid.
Figure 12B:
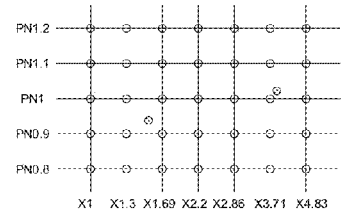
Figure 12C:
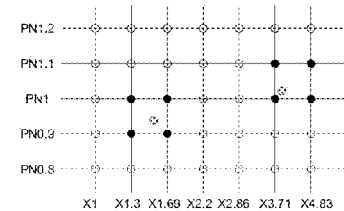

FIGS. 12A-12C illustrate the process of cell uniquification based on a wished distribution. The initial wished grid is a distribution of P/N ratios and drive strengths associated to a given seed cell size. Cells specifications that are considered useful in a context specific to a design can be related to the positions of the wished distribution grid. This adjustment of a cell specification to the grid is important, as it determines the position of cells with respect to the existing grid and determines the neighbor positions to a cell specification. This can be made by scaling a seed cell if the transistor networks of the cell specifications are known.

If the transistor network of the cell specification is not known, the technique can compare the desired electrical characteristics of the cell specification with the characteristics of the cells in the distribution to determine the position of the cell specification with respect to the grid. This can be done by comparing characteristics of the cell specification like the input capacitances (for different pins) and the output delay and slope of the cell specification for some fixed effective fan out (as for instance FO4) of the cell. FIG. 12C highlights the points in the wished grid that are the neighbors to the inserted cell specifications.

Figure 13A:
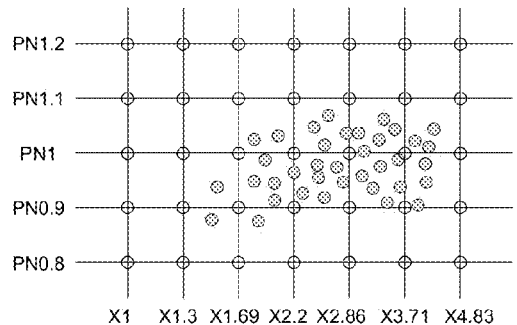
FIGS. 13A-13B show cell uniquification based on wished distribution grid.
Figure 13B:
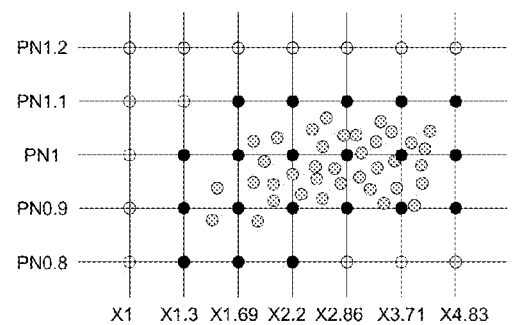

FIGS. 13A-13B illustrate the cell uniquification based on a wished distribution grid. In a first step, the cells are related to the grid as shown in FIG. 13A. In a second step, a set of grid points that are neighbor to the cell specifications are selected to compose the library. FIG. 13B highlights twenty neighbor points in the grid that can be used to compose the final library.

In a first aspect of the invention, a transistor network can be automatically generated for a given functionality. This step is optional, and one (or more) networks could be directly given by the user, or be available from the library. Methods to derive switch networks are provided in previous applications.

Figure 14A:
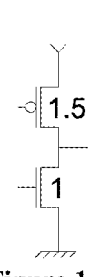
FIGS. 14A-14C show three different seed cells sized from the table of transistor sizes.
Figure 14B:
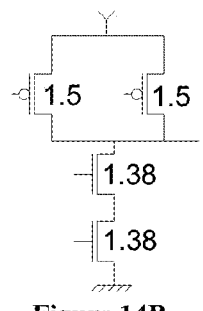
Figure 14C:
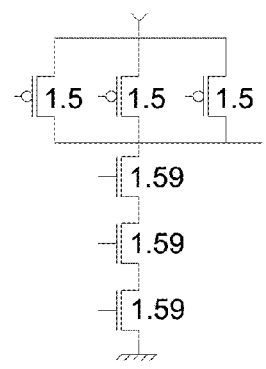

A second aspect of the invention is the production of an initial seed size for a network. One way of doing this is to use a table of transistor sizes as presented in table B and in FIGS. 14A-14C. The table gives the transistor sizes to be used depending on the number of transistors in series in the longest path the transistor belongs. FIGS. 14A-14C can be related with the sizes in table B.

Generally, paths may be taken from the output of a cell stage to a power supply, when there is more than one path; the longest one determines the size. A specific method to derive an initial seed size discussed in this application is for the purpose of illustration and not meant as a limitation to the described method. Several alternative ways can be used to size the initial network to produce a seed size, including the analytical method to compute a single P/N ratio per cell presented in other techniques.

TABLE B

| # of transistors in series | Size of NMOS | Size of PMOS |
| --- | --- | --- |
| 1 | 1 | 1.5 |
| 2 | 1.38 | 1.97 |
| 3 | 1.59 | 2.28 |
| 4 | 1.75 | 2.64 |

In a third aspect of the method, the seed size of the cells are scaled to a given target output capacitance.

Figure 15A:
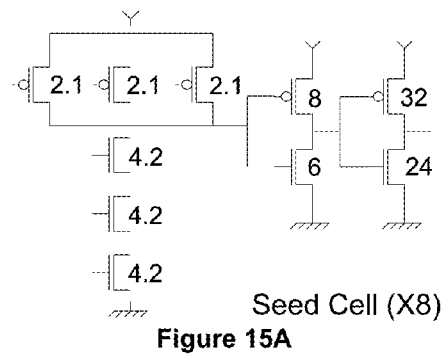
FIGS. 15A-15D show a seed cell and three different sizes derived by scaling the seed size of the cell.
Figure 15B:
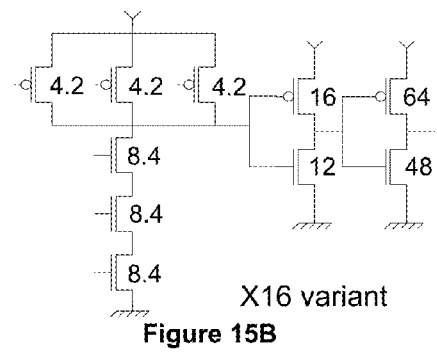
Figure 15C:
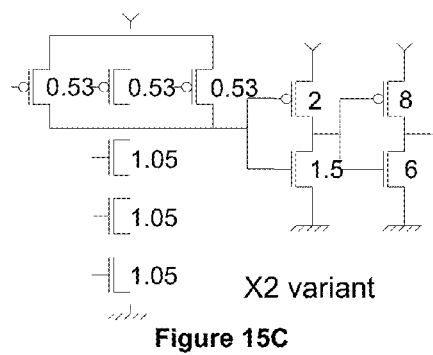
Figure 15D:
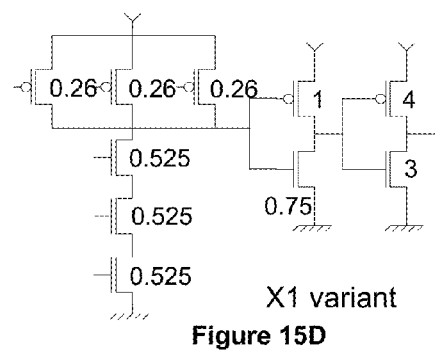

FIGS. 15A-15D show an example of the third aspect of this method. FIG. 15A shows a seed cell of size X8. The midstage, the inverter with PMOS W=8 and NMOS W=6 has a gain of approximately 4, as Cout/Cin=(32+24)/(8+6)=56/14=4 (this assumes the inverter has logical effort LE=1).

The same reasoning can be done for the three-input NAND, assuming it has a logical effort of LE=1.8; this way, gain=LE*(Cout/Cin)=1.8*((8+6)/(2.1+4.2))=1.8*14/6.3=4. The same reasoning can be applied forward to the output stage of the cell, using the equation gain=LE*(Cout/Cin), which can be rewritten as Cout=(gain*Cin)/LE. Thus, the target output capacitance with gain 4 can be computed as Cout=(4*(32+24))/1=224. Using the same reasoning it is easy to verify that the target output capacitance for the cell sizes in FIGS. 15A-15D are as shown in table C below.

TABLE C

| Cell size | Target output capacitance |
|---|---|
| X1 | 28 |
| X2 | 56 |
| X8 | 224 |
| X16 | 448 |

Figure 16A:
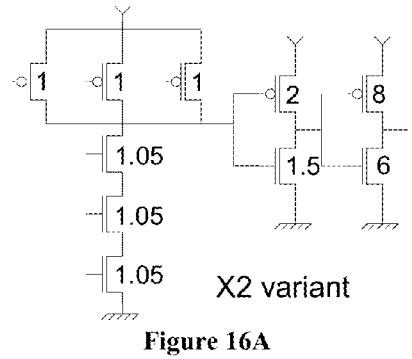
FIGS. 16A-16B show smaller sizes from FIGS. 15A-15D with transistors rounded up to respect the technology minimum.
Figure 16B:
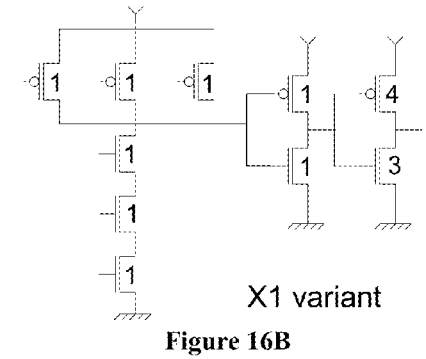
Figure 17A:
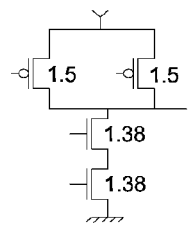
FIGS. 17A-17H show a distribution of seven different sizes derived from an initial seed size.
Figure 17B:
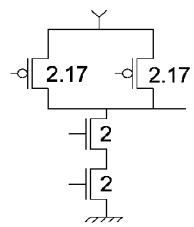
Figure 17C:
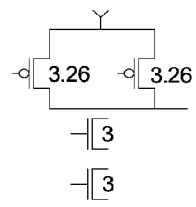
Figure 17D:
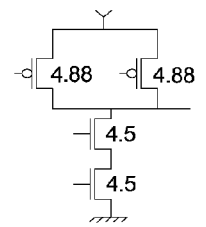
Figure 17E:
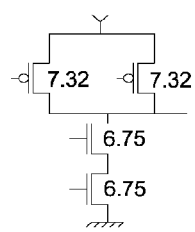
Figure 17F:
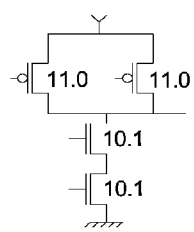
Figure 17G:
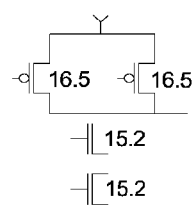
Figure 17H:
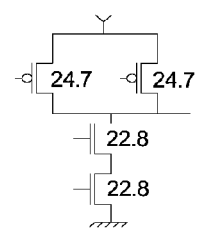
Figure 18A:
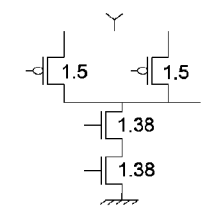
FIGS. 18A-18H show a distribution of seven different sizes derived from an initial seed size, to cover a target output capacitance range with minimum capacitance too small.
Figure 18B:
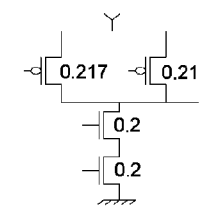
Figure 18C:
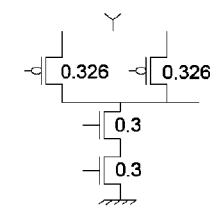
Figure 18D:
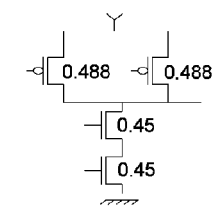
Figure 18E:
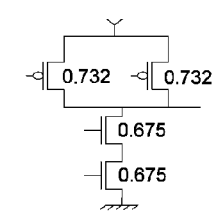
Figure 18F:
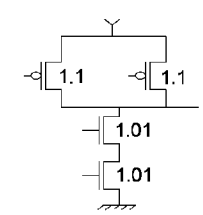
Figure 18G:
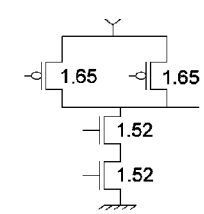
Figure 18H:
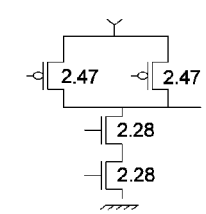
Figure 19A:
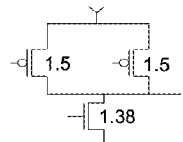
FIGS. 19A-19H show the distribution from FIGS. 18A-18H with transistors rounded up to a technology minimum resulting in four equal cell sizes.
Figure 19B:
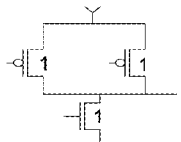
Figure 19C:
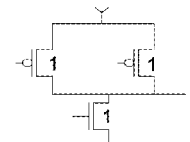
Figure 19D:
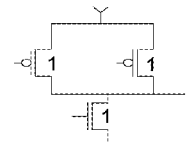
Figure 19E:
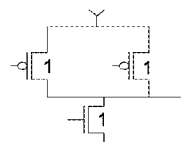
Figure 19F:
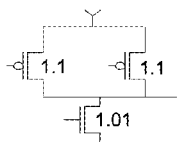
Figure 19G:
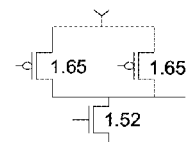
Figure 19H:
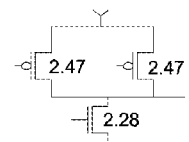

Considering that the sizes in FIGS. 15A-15D are normalized to the minimum transistor size in the target technology, the X1 and X2 variants have transistors smaller than the technology minimum. These transistors are rounded-up to the minimum of the technology as shown in FIGS. 16A-16B.

The method to scale the seed size is presented here is for the purpose of illustrating this method. Several alternative ways can be used to scale the initial seed size to produce networks targeting specific output capacitances.

In a fourth aspect of the invention, a nearly continuous distribution of drive strengths has to be created for the target output range. Consider the distribution presented originally in table C (above) and repeated in table D (below), considering different gains for the last stage of the cells. In another implementation of the method, the four sizes presented in FIGS. 15A-15D may have the target output capacitances varying with the target gain assumed for the last stage of the networks.

Table D illustrates the variation of the target output capacitance as a function of the target gain attributed to the last stage. Table D was generated with the transistor sizes shown in FIGS. 15A-15D, so the gain of intermediate stages is fixed and equal to 4, as described previously. The maximum error in between two successive sizes can be computed through the equation Ci*(1+E)=Ci+1(1−E), so that E=(Ci+1−Ci)/(Ci+1+Ci). So, from table D, the maximum error E for a target capacitance between X2 and X8 sizes for g=2.5 is given by E=(140−35)/(140+35)=0.6. The maximum errors with g=3.6 and with g=4 are also E=0.6. What changes is the target capacitance for which the error occurs; the maximum error occurs for C=56 with g=2.5, for C=80.64 with g=3.6 and for C=89.6 for g=4.

The main observation is that the maximum error remains constant (60 percent) for all three distributions (g=2.5, g=3.6, and g=4) even if the target capacitance that causes the maximum error changes (C=56, C=80.64, and C=89.6). Therefore, if the distribution of cells has an acceptable error in between cells, the gain used to scale the cells will only matter on the extremes of the distribution, as the sizes in the extremes will not have neighbor sizes.

As shown in table E, using a smaller gain (g=2.5) will move the distribution towards larger cells (favoring the high end of the size distribution), while using a larger gain (g=7.5) will move the distribution towards smaller cells (favoring the low end of the size distribution). The "sizes" in table E are shown in terms of sum of transistor widths. This illustrates a tendency in the cell size. The final area of the cells can vary as a function of folding, transistor placement and routing and other issues when adapting the layouts of the cells to a particular library template. This issue can be addressed by adopting a gain that is more near the average used (FO4, for instance) and by tying the extremes of the target distribution to cover the extremes with zero error (which allows a margin of error for target output capacitances outside the extremes of the distribution).

TABLE D

| Cell size | Target output capacitance with g = 2.5 | Target output capacitance with g = 3.6 | Target output capacitance with g = 4 |
|---|---|---|---|
| X1 | 17.5 | 25.2 | 28 |
| X2 | 35 | 50.4 | 56 |
| X8 | 140 | 201.6 | 224 |
| X16 | 280 | 403.2 | 448 |

TABLE E

| Target Capacitance | ΣW with g = 2.5 | ΣW with g = 3.6 | ΣW with g = 4 | ΣW with g = 7.5 |
|---|---|---|---|---|
| 120 | 76.2 | 52.92 | 47.63 | 25.4 |
| 200 | 127 | 88.19 | 79.38 | 42.33 |
| 300 | 190.5 | 132.29 | 119.06 | 63.5 |
| 400 | 254 | 176.39 | 158.75 | 84.67 |

The values in table E were generated by using the same seed cell (intermediate stages have gain=4) and a different gain for the output stage for scaling purposes.

The cells in table F were generated with a single gain for all stages (the scaling gain is the same gain used for intermediate stages). Modifications of the gain for intermediate stages could be used to generate different seed sizes, as shown previously in FIGS. 8A-8B. Table F shows the effect on the size of the cells when the gain at intermediate stages is used to generate different seed cells. Notice that in this case, the sum of transistor widths (ΣW) is not linearly proportional to the gain as it was the case in table E. The "sizes" in table F are shown in terms of a sum of transistor widths. This illustrates a tendency in the cell size where the final area of the cells can vary as a function of folding, transistor placement and routing, and other issues when adapting the layouts of the cells to a particular library template.

TABLE F

| Target Capacitance | ΣW with g = 2.5 | ΣW with g = 3.6 | ΣW with g = 4 |
|---|---|---|---|
| 120 | 108.67 | 56.48 | 47.63 |
| 200 | 181.12 | 94.14 | 79.38 |
| 300 | 271.68 | 141.20 | 119.06 |
| 400 | 362.24 | 188.27 | 158.75 |

TABLE G

| | Smaller Capacitance | Larger Capacitance | Maximum error in between | Capacitance for maximum error |
|---|---|---|---|---|
| Intermediate | 35 | 56 | 23.1% | 43.1 |

TABLE G-continued

| | Smaller Capacitance | Larger Capacitance | Maximum error in between | Capacitance for maximum error |
|---|---|---|---|---|
| cell with C = 56 | 56 | 140 | 42.9% | 80.0 |
| Intermediate | 35 | 70 | 33.3% | 46.7 |
| cell with C = 70 | 70 | 140 | 33.3% | 93.3 |

The goal of a nearly continuous library is to minimize the rounding error when selecting a cell from the library to drive a target output capacitance with a target gain. It has been demonstrated that for the distributions in table D, the maximum error occurs for C=56 with g=2.5, for C=80.64 with g=3.6 and for C=89.6 for g=4. The capacitance for which the maximum error occurs is always between the sizes X2 and X8, which are the most distant successive sizes. In order to reduce this error, it is possible to create a new size between X2 and X8. When the capacitance for the intermediate cell is chosen as the capacitance that causes the maximum error (C=56), the error is not evenly distributed between the two newly created intervals.

Table G shows that the maximum error in the interval 35-56 is 23.1 percent, while the maximum error in the interval 56-140 is 42.9 percent. The choice of an intermediate target capacitance to cause an even distribution can be done using equations (4) and (5), which express the errors in the first and in the second interval.

Equation (4) is represented by the formula: $C_i*(1+E_i) = C_{intermediate}(1-E_1)$ Equation (5) is represented by the formula: $C_{intermediate}*(1+E_2)=C_{i+1}(1-E_2)$ By making $E_1=E_2$ (to distribute the error evenly among the intervals) and dividing left and right sides of equation (4) by the respective right and left sides of equation (5), equation (6) is obtained. From equation (6), it is possible to derive equation (7), which expresses $C_{intermediate}$ as a function of $C_i$ and $C_{i+1}$. From equation (7) it becomes clear that a target output capacitance distribution that minimizes the error is a geometric progression as a target output capacitance that minimizes the error is the geometric mean of its smaller and larger nearest neighbors.

Equation (6) is represented by the formula:

$$\frac{C_i}{C_{intermediate}} = \frac{C_{intermediate}}{C_{i+1}}$$

Equation (7) is represented by the formula: $C_{intermediate}=\sqrt{C_i \cdot C_{i+1}}$ The method to produce a nearly continuous distribution of drive strengths presented here is for the purpose of illustration and not meant as a limitation to the method described. Several alternative ways can be used to distribute the drive strengths targeting specific output capacitances. For example, an arithmetic progression would minimize the absolute error of the distribution, or the user can provide or interact with an initial distribution to generate the distribution with the characteristics he or she wants, minimizing errors that present more significance to the designer.

In a fifth aspect of the invention, distributions of target capacitances have to be computed to cover a target range of capacitances. The parameters for this distribution are the following:

P1 is the minimum target output capacitance in the range.
P2 is the maximum target output capacitance in the range.
P3 is the maximum error allowed in between two successive cell sizes.
P4 is the maximum number of cells allowed by the user.
P5 is the gain used to scale the last stage of the seed cells.

These parameters interact among them in a number of ways. For example, increasing the distance among P1 and P2 will tend to increase the error in between two successive cells (P3) or the number of necessary cells to keep P3 under a given threshold. The gain used to scale the seed cells (P5) will shift the distribution towards larger cells (when the gain is reduced) or smaller cells (when the gain is increased). Thus, a user can generate different libraries by modifying these parameters. In the following, some combinations of parameters are exemplified for better understanding of the method.

Combinations 1-4 discussed below take into consideration a distribution of 2-input NAND sizes from the seed size shown in FIGS. 17A-17H.

Combination 1. Assume that the logical effort of this cell is 1.67. Consider that the designers want initially the parameters P1=10, P2=100, P3=20 percent, P4=7, and P5=4. From these parameters, the distributions in FIGS. 17A-17H are generated using a geometric progression with ratio of 1.5, which gives an intermediate error of 20 percent in between successive sizes, as E=(1.5−1)/(1.5+1)=0.2=20 percent. The resulting distribution in FIGS. 17A-17H have in practice the following parameters: P1=10, P2=114, P3=20 percent, P4=7 and P5=4.

One of skill in the art would appreciate that some trade-offs are possible, such as reducing the size of the largest cell, which is aimed to a target output capacitance of 114. This would allow redistributing all the sizes in order to reduce overall maximum error. By doing so it is possible to adopt a ratio of 1.47, which gives an intermediate error of E=(1.47−1)/(1.47+1)=0.19=19 percent. This way the largest size would be an X10, aimed at a target output capacitance of 100.

By adopting this tradeoff, an alternative distribution with the following parameters is obtained P1=10, P2=100, P3=19 percent, P4=7 and P5=4. A different trade-off would be to shift the distribution to the smaller cells while maintaining the error in 20 percent (and the ratio of 1.5). This approach for trading off leads to another alternative distribution with parameters P1=9.35, P2=106.5, P3=20 percent, P4=7, and P5=4.

Combination 2. Assume that the logical effort of this cell is 1.67. Consider that the designers want initially the parameters P1=10, P2=100, P3=30 percent, P4=12, and P5=4. This distribution is very easy to achieve, and in this case the user should decide the priorities to be followed: Minimize the number of cells respecting the maximum error; use the maximum number of cells and reduce the error; extend the interval P1-P2 using the maximum number of cells or use a weighted combination of stretching these goals.

Combination 3. Assume that the logical effort of this cell is 1.67. Consider that the designers want initially the parameters P1=10, P2=100, P3=15 percent, P4=5, and P5=4. This distribution is not possible to obtain. The designer should then adopt a trade-off to arrive to a possible distribution: allow increasing the number of cells or the maximum error, or a combination of these; or allow reducing the covered interval or using a weighted combination for relaxing the initial conditions.

Combination 4. Assume that the logical effort of this cell is 1.67. Consider that the designers want initially the parameters P1=1, P2=10, P3=20 percent, P4=7, and P5=4. This distribution would start with the size X0.1, and the first four sizes (X0.1 to X0.338) in the distribution would have all transistors with sizes smaller than the technology minimum, as shown in FIGS. 18A-18H. This way these cells have transistors rounded up to the technology minimum, resulting in four identical cells, as shown in FIGS. 19A-19H.

Thus, the intended original parameters are not a good choice, and the first cell size with transistors not to be rounded up is the X0.5 size. Below the X0.46 size, all the transistors have to be rounded up to the technology minimum and in practice no different sizes are produced. As before, the generation of the distribution as required by the designer produces a diagnosis that can be used to derive a better trade-off in the selection of the parameters.

A method to produce a nearly continuous distribution of target capacitances specifying drive strengths presented here is for the purposes of illustration and not meant as a limitation to the method. Several alternative ways can be used to distribute the drive strengths targeting specific output capacitances. For example, an arithmetic progression could minimize the absolute error of the distribution, or the user can provide or interact with an initial distribution to generate the distribution with the characteristics he or she wants.

In a sixth aspect of the invention, it is possible to generate P/N variants of seed cells. As described previously, the skew variants are versions of given cells with same transistor networks and same (or roughly the same) relative proportion among transistors of the same type, but different ratios between PMOS and NMOS.

Figure 20A:
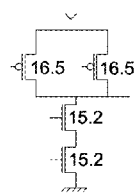
FIGS. 20A-20D show three different skew variants derived from a reference cell.
Figure 20B:
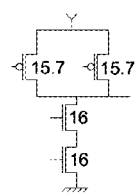
Figure 20C:
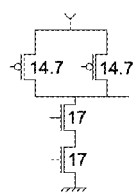
Figure 20D:
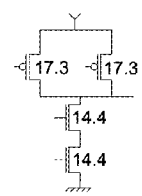

Normally skew variants offer cells with different P/N ratios but same (or roughly the same) input capacitance. As an example consider the seed cell shown in FIGS. 20A-20D. As shown in FIG. 20A, for the reference cell, the P/N scale factor is 1 (reference) and the reference P/N ratio is 16.5/15.2=1.0855. In order to produce P/N variants of the reference cell, a P/N scale factor can be used to multiply the reference P/N to produce a variant P/N ratio. For example, the variant with a P/N scale factor of 0.9 has a ratio P/N=0.9*1.0855=0.9770. This computed ratio is then used to divide the original input pin capacitance of 31.7 (16.5+15.2) such that the new ratio is obtained (15.7/16=0.9770) and the input capacitance remains the same (15.7+16=31.7). This procedure is used to scale the ratio among the sizes between PMOS and NMOS for a given input pin. When there is more than one transistor of the same type (PMOS or NMOS) connected to the same input pin, the proportion among the same type transistors is preserved.

A method to produce P/N variants for a specific cell is presented for purposes of illustration, and not as a limitation. Several alternative ways can be used to produce P/N variants for a specific cell. For example, the table of transistor sizes to size the cell could be scaled to produce P/N variants. In the case of multistage cells, different P/N scale factors could be applied to each stage.

Figure 21A:
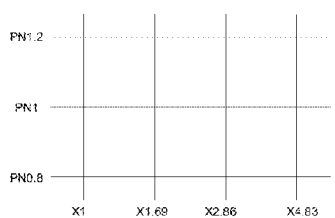
FIGS. 21A-21C show three different size distributions derived from a given seed cell.
Figure 21B:
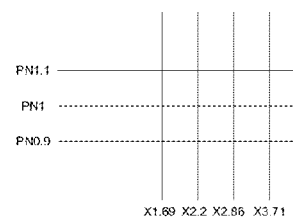
Figure 21C:
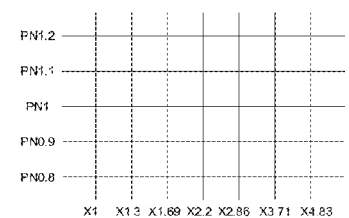
Figure 22A:
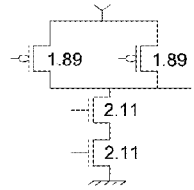
FIGS. 22A-22F show a six-cell distribution illustrating drive strengths and P/N ratios.
Figure 22B:
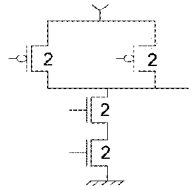
Figure 22C:
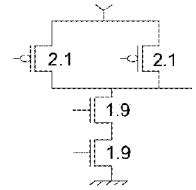
Figure 22D:
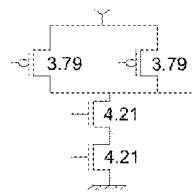
Figure 22E:
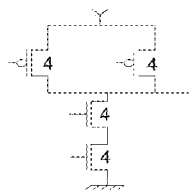
Figure 22F:
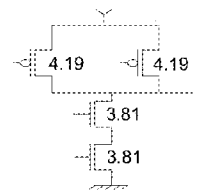

FIGS. 21A-21C show a seventh aspect of the invention where it is possible to align distributions of drive strengths with distribution of skew (P/N ratio) variants. Three different size distributions are shown. The first distribution is a sparse distribution of 12 different sizes; the second distribution is a narrow distribution of 12 different sizes. These distributions illustrate the trade-off between enlarging the space covered by the set of cells and reducing the error (in between cells). The third distribution has 35 cells and illustrates the cost of having a broad coverage with a small error in between cells.

FIGS. 22A-22F show the transistor network sizes for a distribution of two drive strengths and three P/N ratios illustrating six different cells. The distributions can be obtained first by distributing the drive strengths and then generating the P/N ratio variants for each drive strength; or by generating the P/N ratios for the seed scaled to X1 and then generating size distributions from each P/N ratio seed cell.

Figure 23A:
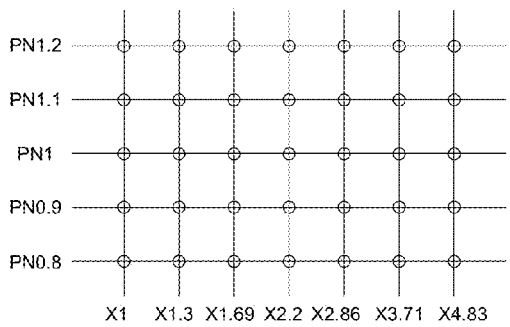
FIGS. 23A-23B show cell uniquification based on a wish grid.
Figure 23B:
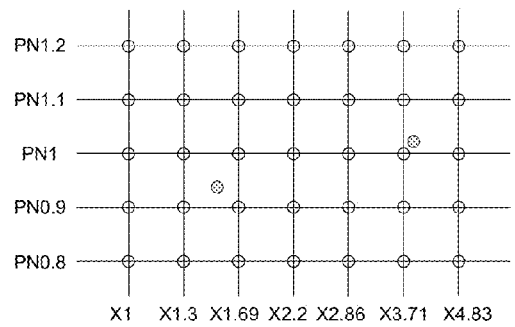

In an eighth aspect of the invention, cell specifications obtained while optimizing cells to a specific design context are related to a wished distribution grid. FIG. 23A shows an example of an initial wished grid, which is a distribution of P/N ratios and drive strengths associated to a given seed cell size. As shown in FIG. 23B, cell specifications that are considered useful in a context specific to a design can be related to the positions of the wished distribution grid. This adjustment of a cell specification to the grid is important, as it determines the position of cells with respect to the existing grid and determines the neighbor positions to a cell specification. This can be made by scaling a seed cell if the transistor networks of the cell specifications are known.

If the transistor network of the cell specification is not known, the technique can compare the desired electrical characteristics of the cell specification with the characteristics of the cells in the distribution to determine the position of the cell specification with respect to the grid. This can be done by comparing characteristics of the cell specification like the input capacitances (for different pins) and the output delay and slope of the cell specification for some fixed effective fan out (as for instance FO4) of the cell.

Figure 24A:
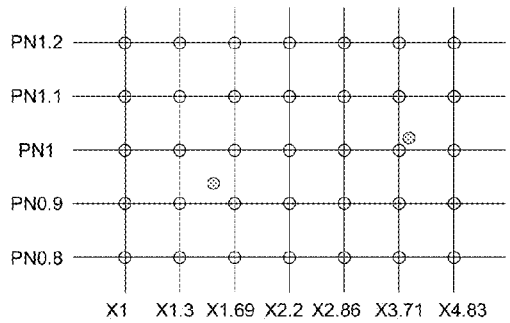
FIGS. 24A-24B show neighbor grid positions for two cell specifications.
Figure 24B:
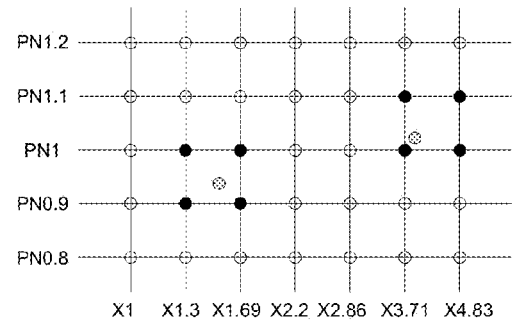
Figure 25A:
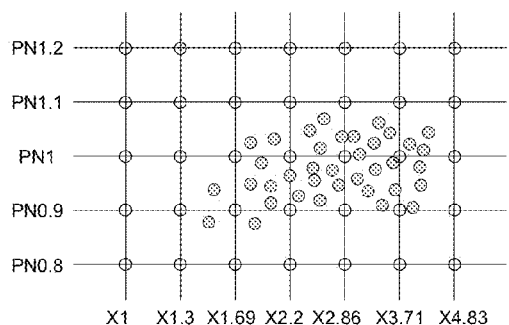
FIGS. 25A-25B show neighbor grid positions for several cell specifications.
Figure 25B:
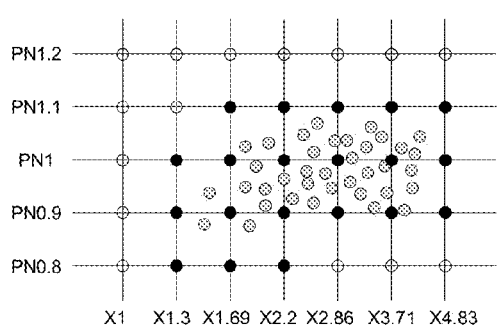

In a ninth aspect of the invention, the neighbors of the cell specifications in the grid are determined. This is shown in FIGS. 24A-24B. FIG. 24A shows the cell specifications related to the grid, while FIG. 24B highlights the neighbor positions in the grid. The number of neighbors is smaller than the number of cells for circuits having a large number of instances, as illustrated in FIGS. 25A-25B. FIG. 25A shows the cell specifications related to the grid, while FIG. 25B highlights the neighbor positions in the grid. The concept of a neighbor could be used to choose a larger or smaller number of neighbors to the cell specifications, resulting on a larger or smaller number of cells in the final library. Upon a user request, the highlighted grid is displayed to the user.

Figure 26:
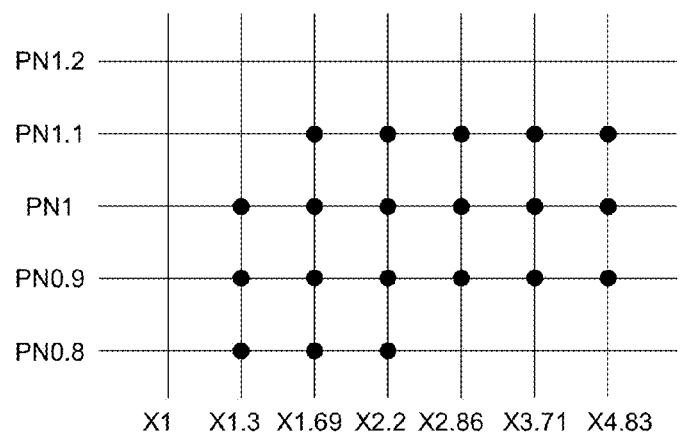
FIG. 26 shows grid points used to compose a 20-cell library.

In a tenth aspect of the invention, the effective set of grid points used to compose the final library is selected. FIG. 26 illustrates a set of 20 grid points chosen to compose a cell library by choosing the neighbor grid points illustrated in FIG. 25. The example is presented with the purposes of illustration, not limitation.

Figure 27A:
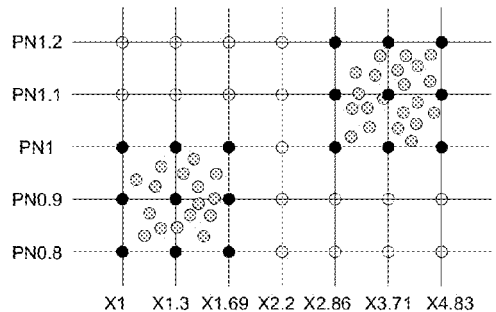
FIGS. 27A-27B show a library with an excessive gap in the distribution.
Figure 27B:
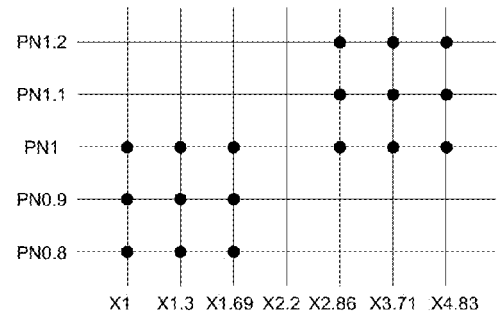
Figure 28A:
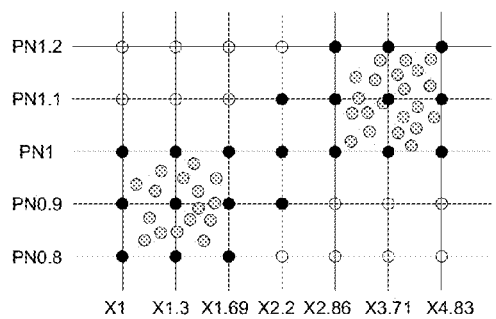
FIGS. 28A-28B show a library with a continuous distribution.
Figure 28B:
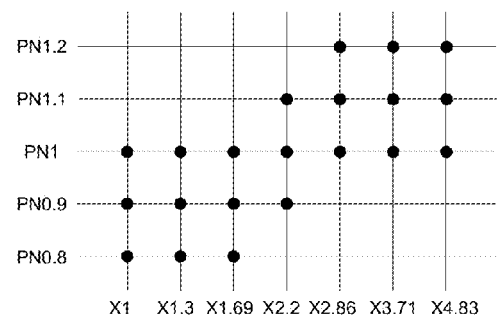

As another example, consider the sparse set of cell specifications presented in FIG. 27A. If the neighbors in the strict sense are chosen, it would result in a library that has an excessive gap in the set of drive strengths as no X2.2 cell was included in the library; as shown by the 18-cell library in FIG. 27B. The designer can control properties of the final set of points in the distribution grid as shown in FIGS. 28A-28B. The use of three bridging neighbors shown in FIG. 28A will result in a continuous library composed of 21 cells shown in FIG. 28B.

The method of this invention can be executed to produce distributions of drive strengths and P/N variants for each seed size independently. This allows for parallel implementations of the method, as parallel computers are becoming more available. Also, it is possible to select different ratios for drive strengths of different functions. Thus, more used cells like inverters and buffers can have a smaller error and a wider coverage compared to less frequent cells. Different seed networks can be targeted to different target output capacitance ranges as a function of the seed topology, notably the number of stages.

Pareto analysis can be performed on different seed networks associated to the same logic functionality. Examples include selection of just the smaller area (before or after layout) variant, smaller ΣW variant, smaller input capacitance, smaller intrinsic delay or smaller power consumption variant for each drive strength more broadly where Pareto analysis could select any combination of the winning cells listed before.

The method is also applicable to memory elements, flip-flops (FFs), and latches, considering that for these specific cases some transistors of the seed network are not scaled nor have specific scaling rules. For example, it is possible to scale only the inverters connected to the output or to add an output buffer for the specific purpose of scaling the drive strengths of memory elements, flip-flops (FFs), and latches. When using an output buffer, it may not be needed for small drive strengths. Pareto simplification could eliminate these cases when more than one seed network is used for the same topology.

In a specific implementation, a first portion of the data for the cells used in the synthesis engine are partially generated by simulation of at least some of the points of the distribution. For example, the simulation may include 10, 20, 30, 40, 50, 60, 70, 80, or 90 percent of the points of the distribution. For other points of the distribution (e.g., remaining points of the distribution or a portion of the remaining points of the distribution), it is generated by scaling the data obtained from the simulations according to the P/N ratios and drive strengths. Any factor may be used to scale the data.

1. A method to reduce a number of newly created cells when performing optimization of an integrated circuit design comprising:
    receiving a distribution of drive strengths;
    generating a first cell to optimize the circuit, wherein the first cell is associated with the distribution;
    computing a first drive strength for the first cell; and
    using a neighbor cell specified by the distribution instead of the first cell, wherein the neighbor cell is.

2. A method to reduce a number of newly created cells when performing optimization of an integrated circuit design comprising:
    receiving a distribution of P/N ratios;
    generating a first cell to optimize the circuit, wherein the first cell is associated with the distribution;
    computing a first P/N ratio for the first cell; and
    using a neighbor cell specified by the distribution instead of the first cell.

3. A method to reduce a number of newly created cells when performing optimization of an integrated circuit design comprising:
    receiving a first distribution of drive strengths;
    receiving a first distribution of P/N ratios;
    generating a first cell to optimize the circuit, wherein the first cell is associated with the first distribution;
    computing a drive strength and first P/N ratio for the first cell;
    using a first neighbor cell specified by the first distribution of drive strengths and first the distribution of P/N ratios instead of the first cell.

4. The method of claim 3 comprising:
    receiving a second distribution of drive strengths;
    receiving a second distribution of P/N ratios;
    generating a second cell to optimize the circuit, wherein the second cell is associated with the second distribution;
    computing a drive strength and first P/N ratio for the second cell;
    using the first neighbor cell specified by the second distribution of drive strengths and second the distribution of P/N ratios instead of the second cell.

5. The method of claim 4 comprising storing the first neighbor cell in a final library.

6. The method of claim 1, wherein the generating a first cell comprises utilizing a first table, wherein the first table comprises information on transistor sizes.

7. The method of claim 1, wherein the generating a first cell comprises considering at least one alternative transistor networks.

8. The method of claim 1 wherein the at least one alternative transistor networks is input by a user.

9. The method of claim 1 wherein the first distribution of drive strengths and the first distribution of P/N ratios is derived from an initial seed.

10. The method of claim 3, wherein the first distribution of drive strengths and the first distribution of P/N ratios are stored in a source library, wherein the source library is associated with an initial integrated circuit design and comprises at least a plurality of logic functions that can be implemented as a single cell.

11. The method of claim 10 comprising:
    accessing the source library;
    accessing the initial integrated circuit design;
    accessing a set of design constraints; and
    using a mapping tool to access a first target library to map the optimization of the integrated circuit design, wherein the first target library comprises at least a plurality of logic functions that can be implemented as a single cell, and wherein the mapping comprises expressing the initial integrated circuit design as a network of interconnected cells from the source library; and
    generating a mapped design that instantiates cells from the target library, wherein the mapped design is the optimization of the integrated circuit design.

12. The method of claim 11 wherein the source library and the target library are the same.

13. The method of claim 10 wherein the initial integrated circuit design is an unmapped design.

14. The method of claim 11 comprising using the mapping tool to access a second target library to map the optimization of the integrated circuit design, and the first target library is different from the second target library.

15. A method to reduce a number of newly created cells when performing optimization of an integrated circuit design comprising:
    determining an initial seed size for a network to generate a continuous distribution of drive strengths, wherein the initial seed size is associated with an initial seed;
    receiving a set of parameters from a user, wherein the set of parameters comprises a minimum output target capacitance, a maximum output target capacitance, a maximum error allowed in between two successive cell sizes, a maximum number of cells allowed by the user, and a gain, wherein the gain is used to scale a last stage of the initial seed cell;
    generating a first set of a distribution of cells, wherein the generating a first set of a distribution of cells comprises generating a first number of drive strengths for the network, and generating a second number of P/N ratio strengths;
    generating a target range of capacitances to be driven, a maximum rounding error, and a distribution function.

16. The method of claim 15 wherein the generating a target range of capacitances to be driven comprises:
    receiving a target output capacitance; and
    scaling the first seed size of the cells to the target output capacitance.

17. A method of processing cell uniquifications comprising:

providing an initial seed cell, the initial seed cell having an initial seed cell size;

providing a first grid, wherein the first grid is a first distribution of P/N ratios and drive strengths associated with the initial seed cell size;

adjusting/marking/mapping/inserting a first set of cell specifications, wherein the first set of cell specifications is associated with positions on the first grid, and the adjusting/marking/mapping determines the positions of the cells in the first set with respect to the first grid, and determines neighbor positions, wherein the neighbor positions are the nearest grid points on the first grid, and associated with cells in the first set.

18. The method of claim 17 wherein the adjusting/marking/mapping comprises:

if transistor networks of the first set of cell specifications are known, scaling the initial seed cell;

if transistor networks of the first set of cell specifications are not known, comparing desired characteristics of the first set of cell specifications with the characteristics of cells in the first distribution of P/N ratios and drive strengths.

19. The method of claim 18 wherein the characteristics of the first set of cell specifications comprise an output delay.

20. The method of claim 17 comprising inserting the neighbors to the cell specifications into a final library.

21. The method of claim 17 comprising:

after the adjusting/marking/mapping, highlighting the points in the first grid that are neighbors to the cell specifications.

22. The method of claim 21 comprising displaying the highlighted first grid to a user.

23. A system that reduces a number of newly created cells when performing optimization of an integrated circuit design comprising:

a synthesis engine arrangement, the synthesis engine arrangement being arranged to access a source library, an initial design, a target library, and a set of design constraints, and further arranged to map a design;

the source library, wherein the source library is associated with the initial design and comprises at least a plurality of logic functions that can be implemented as a single cell;

the target library, where the target library comprises at least a plurality of logic functions that can be implemented as a single cell.

This description of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications. This description will enable others skilled in the art to best utilize and practice the invention in various embodiments and with various modifications as are suited to a particular use. The scope of the invention is defined by the following claims.

The invention claimed is:

1. A method of optimizing an integrated circuit design comprising:

receiving a distribution of drive strengths and P/N ratios;

using at least one processor, generating a specific cell to optimize a circuit; and using a neighbor cell specified by the distribution of drive strengths and not the specific cell, computing a drive strength of the specific cell, wherein the distribution of drive strengths and P/N ratios is arranged in a grid of rows of different P/N ratios and columns of different drive strengths, and at an intersection of each row and column is a cell.

2. The method of claim 1 wherein the drive strength of the specific cell is not in the distribution of drive strengths.

3. The method of claim 1 further comprising:

generating the specific cell using a table of transistor sizes.

4. The method of claim 1 wherein two or more alternative transistor networks are considered to generate the specific cell.

5. The method of claim 1 wherein the distribution of drive strengths and P/N ratios is represented as a library of cells having first data to be used in a synthesis engine.

6. The method of claim 5 further comprising:

generating a first portion of the first data by simulation of at least some points of the distribution; and generating a second portion of the first data by scaling second data obtained from simulations based on the P/N ratios and drive strengths.

7. The method of claim 1 further comprising:

generating the specific cell using a table of transistor sizes, wherein two or more alternative transistor networks are considered, and the distribution of drive strengths and P/N ratios is represented as a library of cells having first data to be used in a synthesis engine.

8. The method of claim 7 further comprising:

generating a first portion of the first data by simulation of at least some points of the distribution; and generating a second portion of the first data by scaling second data obtained from simulations based on the P/N ratios and drive strengths.

9. The method of claim 1 comprising:

reducing a number of newly created cells.

* * * * *